(No Model.)
L. B. PERRY & J. C. MITCHELL.
FIFTH WHEEL FOR RAILWAY CARS.
No. 605,205. Patented June 7, 1898.
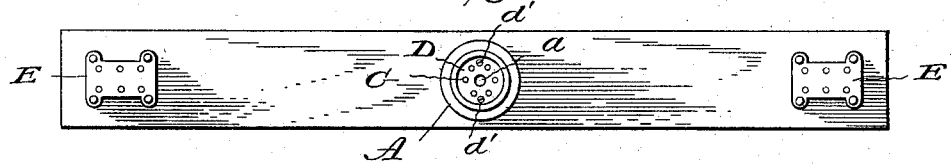
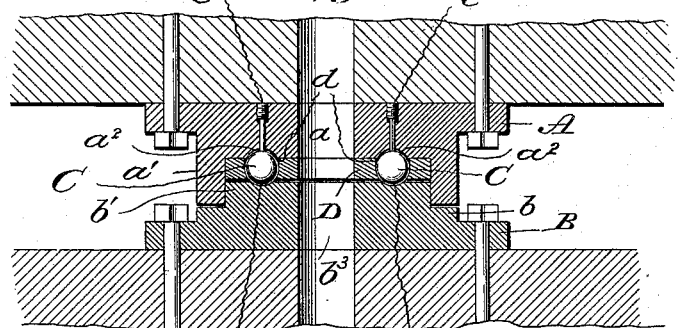
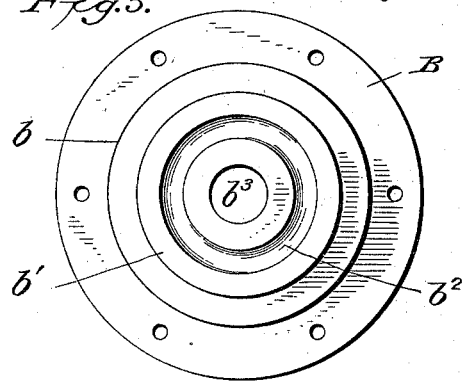
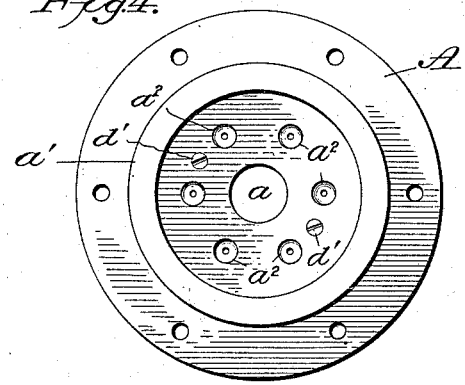
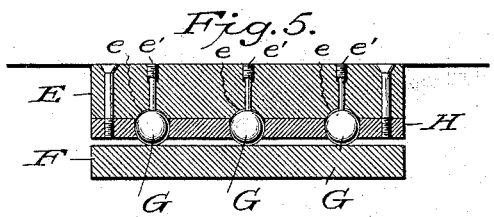
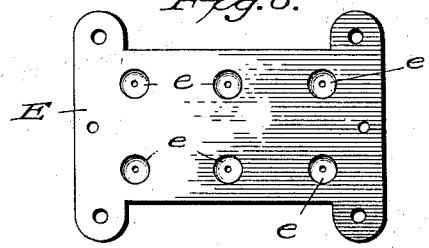
WITNESSES
L. S. Elliott.
Grafton d. McGill.
Levi B. Perry
James C. Mitchell
INVENTORS
by John B. Thomas & Co.,
Attorneys
THE NORRIS PETERS CO., PHOTO-LITHO., WASHINGTON, D. C.

UNITED STATES PATENT OFFICE.

LEVI B. PERRY AND JAMES C. MITCHELL, OF LEWISTON, MAINE, ASSIGNORS OF THREE-TWENTIETHS TO HERBERT E. CHASE, OF SAME PLACE.

FIFTH-WHEEL FOR RAILWAY-CARS.

SPECIFICATION forming part of Letters Patent No. 605,205, dated June 7, 1898.

Application filed September 14, 1897. Serial No. 651,613. (No model.)

*To all whom it may concern:*

Be it known that we, LEVI B. PERRY and JAMES C. MITCHELL, citizens of the United States of America, residing at Lewiston, in the county of Androscoggin and State of Maine, have invented certain new and useful Improvements in Fifth-Wheels for Railway-Cars; and we do hereby declare the following to be a full, clear, and exact description of the invention, such as will enable others skilled in the art to which it appertains to make and use the same.

This invention is an improvement in swivels or pivot connections, the primary object of the same being to provide a fifth-wheel for railway-cars which will considerably reduce the friction at this point, and thereby present an easy movement of the body upon the trucks in rounding curves, removing the rough jerky motions occasioned by the undue friction upon the ordinary fifth-wheel.

The present invention contemplates a construction and arrangement of the parts providing a simple, strong, and effective swivel for heavy bodies that reduces the friction to a minimum and thoroughly protects the bearing-surfaces from dust or grit.

To the accomplishment of the above objects and such others as the invention may pertain, the same consists particularly in a circular plate or member having a central opening, an outer depending flange, and concave recesses in the depressed portion encircling the opening, said recesses being provided centrally with steel bearing-posts, balls seated within the recesses upon the posts, and an annular retaining-plate through which the balls project, together with a second plate or member having a central opening, a raised central portion, and a circular groove forming a runway for the balls carried by the other plate or member.

The following specification will give a detail description of the parts constituting the invention, and what is claimed as new in the art will be more specifically set forth in the appended claims.

In the accompanying drawings, which form a part of this specification, Figure 1 is a bottom plan view showing the part of the swivel which is attached to the sill when applied to a railway-car and including rub-plates located at the ends of said sill. Fig. 2 is a sectional view through the two parts of the swivel. Fig. 3 is a detail plan view of the lower member or plate which is secured to the truck. Fig. 4 is an inverted plan view of the upper plate or member with the retaining-plate and balls removed. Fig. 5 is a sectional view through the rub-plates. Fig. 6 is an inverted plan view of the upper member of the rub-plates with the retaining-plate and balls removed.

The principal part of the invention, the swivel, is made up practically of two parts A and B, respectively, the part A, which is attached to the sill of the car, comprising a circular plate having a central opening $a$ and a depending annular flange $a'$ near its outer edge, presenting a surrounding web through which the retaining screws or bolts pass in securing the member in place. The annular flange $a'$ forms a depressed surface around the central opening, and within this surface are formed a concentric series of concave recesses $a^2$, said recesses being located between the central opening and depending flange of the plate or member. Into the center of each concave recess projects a bearing post or pin $c$, which is of hardened steel and is let into the plate, extending therethrough. These posts form the bearings for antifriction-balls, hereinafter mentioned, and consequently it is contemplated to make the plate a casting, or it may be a forging. The central opening in the plate just described is designed for the passage of the king-bolt or a pivot-pin.

C designates a series of balls which are placed within the concave recesses $a^2$ and held therein by a retaining-plate D, having a corresponding series of openings $d$, through which said balls project slightly beyond the plate. This retaining-plate is annular in shape, the central opening therein registering with the central opening of the main plate or member, while the outer edge of said retaining-plate bears against the flange $a'$, within which it is seated, the flange depending below the plate for the purpose hereinafter specified. As shown, the retaining-plate D is held in place by machine-screws $d'$, though it is obvious that other fastening means could be employed.

The part B, which forms the runway or lower bearing for the balls, is preferably a forging shaped to present a step or circular shoulder $b$, from which projects a central raised portion $b'$, in the upper surface of which is formed a circular groove or runway $b^2$. A central opening $b^3$ extends through the part B and registers with the corresponding opening in the other part of the swivel, and when both parts are together the raised portion of B fits within the depending flange of A, the latter resting upon the shoulder $b$ and acting as a sand-band to prevent the ingress of dust or grit.

From the foregoing description of the swivel, in connection with the accompanying drawings, it is apparent that a strong and easy moving connection is presented, and though we have described its application to a railway-car as a fifth-wheel it will be obvious that it could be used as effectively for a turn-table or wherever a swivel connection is employed. The balls have their principal bearing upon the posts and lower plate or member B, and as they frictionally bear against the retaining-plate the latter is preferably made of steel. The bearing ends of the posts may be brought to a point and, as they project into the concave recesses, form a small contact-point for the balls.

The rub-plates, shown in connection with the swivel, when applied to a railway-car are constructed after the manner of said swivel, comprising the two parts E and F, rectangular in shape, one part having a series of concave recesses $e$, into which project pins or posts $e'$, while the other part, F, has a smooth upper surface. Both parts are provided with projecting ears pierced for the reception of the retaining screws or bolts. Balls G are seated within the concave recesses to bear upon the posts and are held in place by a retaining-plate H, having holes through which the balls project to contact with the aforesaid bearing-plate. When applied, the parts E and F move in opposite directions laterally and prevent wear of the sill and truck of a car in rounding a curve or when a rocking movement is imparted to the car-body.

Having thus described the invention, what is claimed as new, and desired to be secured by Letters Patent, is—

1. A swivel for the purposes set forth, comprising two parts, one having a depending annular flange forming a depressed surface within the same, said surface being provided with a concentric series of concave recesses, and the other part having a central raised portion fitting within the flange; together with balls seated within the recesses of the first-mentioned part to bear upon the raised portion of the last-mentioned part, substantially as shown and described.

2. A swivel for the purposes set forth, comprising two parts having registering central openings to receive a king-bolt or pivot-pin, one of the parts presenting an annular flange forming a depressed surface surrounding the opening, said surface being provided with concave recesses, balls seated within the concave recesses, and a retaining-plate fitting within the flange and having openings through which the balls project slightly beyond said plate; together with the other part having a central raised portion fitting within the flange and presenting a surface provided with a circular groove or runway, substantially as shown and described.

3. A swivel for the purpose set forth, comprising two circular plates, one having a depending annular flange forming a central depressed portion and surrounding web, the depressed portion being provided with a concentric series of concave recesses, bearing-surfaces located in said recesses, balls bearing within the recesses, and a retaining-plate fitting within the flange and having openings through which the balls pass; together with the other plate having a surrounding web and a central raised portion forming a circular shoulder, the upper surface of the raised portion being provided with a circular groove; both of the aforesaid plates having central openings through which passes a king-bolt or pivot-pin, substantially as shown and described.

4. A swivel for the purpose set forth, the combination, of a circular plate having a depending annular shoulder near its outer edge forming a depressed surface surrounding a central opening in the plate, said surface being provided with a concentric series of concave recesses, bearing-posts extending into said recesses centrally, balls seated within the recesses upon the posts, a retaining-plate fitting within the flanges and having openings through which the balls project slightly beyond said plate, and means for holding the retaining-plate in place; together with a circular plate presenting a surrounding web and a central raised portion forming a circular step or shoulder, the upper surface of the raised portion having a circular groove surrounding a central opening in the plate which registers with the central opening in the other plate, the raised portion of the last-mentioned plate fitting within the annular flange of the first-mentioned plate, as herein shown and described.

5. The rub-plates, for the purpose set forth, comprising a member having a series of concave recesses and projecting ears, bearing-posts extending into the center of the concave recesses, a retaining-plate having openings through which the balls project, and means for holding the retaining-plate in place; together with a second member having a plain upper surface and projecting ears, as shown and described.

In testimony whereof we affix our signatures in presence of two witnesses.

LEVI B. PERRY.
JAMES C. MITCHELL.

Witnesses:
CHAS. A. MAYO,
H. E. CHASE.